United States Patent [19]

Nelson

[11] 4,154,221

[45] May 15, 1979

[54] TRACKING SYSTEM FOR SOLAR ENERGY COLLECTION

[75] Inventor: David H. Nelson, Twentynine Palms, Calif.

[73] Assignee: American Solar, Arroyo Grande, Calif.

[21] Appl. No.: 789,424

[22] Filed: Apr. 21, 1977

Related U.S. Application Data

[63] Continuation-in-part of Ser. No. 744,290, Nov. 22, 1976, Pat. No. 4,108,154.

[51] Int. Cl.² ............................................. F24J 3/02
[52] U.S. Cl. ...................................... 126/270; 108/2; 108/9
[58] Field of Search ............... 126/270, 271; 237/1 A; 250/203 R; 108/2;9;10

[56] References Cited

U.S. PATENT DOCUMENTS

| 987,113 | 3/1911 | Cooley | 108/10 |
|---|---|---|---|
| 1,951,404 | 3/1934 | Goddard | 126/270 |
| 2,182,222 | 12/1939 | Courtis et al. | 126/270 |
| 2,539,700 | 1/1951 | Pieper | 108/2 |
| 3,305,686 | 2/1967 | Carter et al. | 126/270 |
| 3,861,379 | 1/1975 | Anderson, Jr. | 126/271 |
| 3,872,854 | 3/1975 | Raser | 126/270 |
| 3,996,917 | 12/1976 | Trihey | 126/270 |
| 4,031,385 | 6/1977 | Zerlant et al. | 126/270 |

FOREIGN PATENT DOCUMENTS

| 2308066 | 12/1976 | France | 126/271 |
|---|---|---|---|
| 822768 | 10/1959 | United Kingdom | 126/271 |

*Primary Examiner*—Henry C. Yuen
*Attorney, Agent, or Firm*—Fulwider, Patton, Rieber, Lee & Utecht

[57] ABSTRACT

A tracking system is provided for positioning solar energy collection units to face the sun during daylight hours. The collectors are mounted generally in north-south alignment with rotatable connections to a supporting base. The connections are laterally offset from the center of gravity of the collector. Thus, the weight of the collector ends to rotate the collector about the connection points to bring the center of gravity to the lowest possible point, thereby orienting the collector generally to face the western horizon. A rotation restraint mechanism is provided to prevent the uncontrolled rotation of the collector to a degree coordinated with rotation of the earth relative to the sun, thereby positioning the collector to directly face the sun during daylight hours. A rank of collectors in parallel alignment can be connected for tandem rotation under the control of a single rotation restraining mechanism. Rotation restraint can be effectuated by means of an electric brake or by a solenoid actuated pawl and ratchet gear.

11 Claims, 8 Drawing Figures

U.S. Patent  May 15, 1979  4,154,221
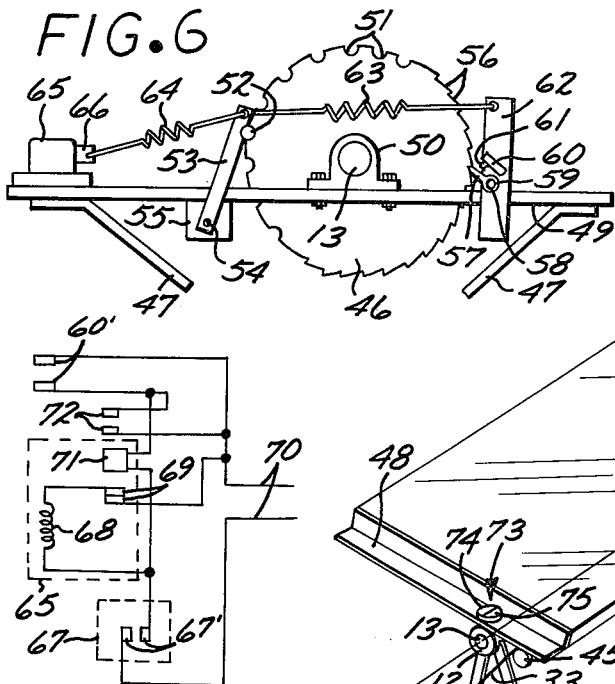
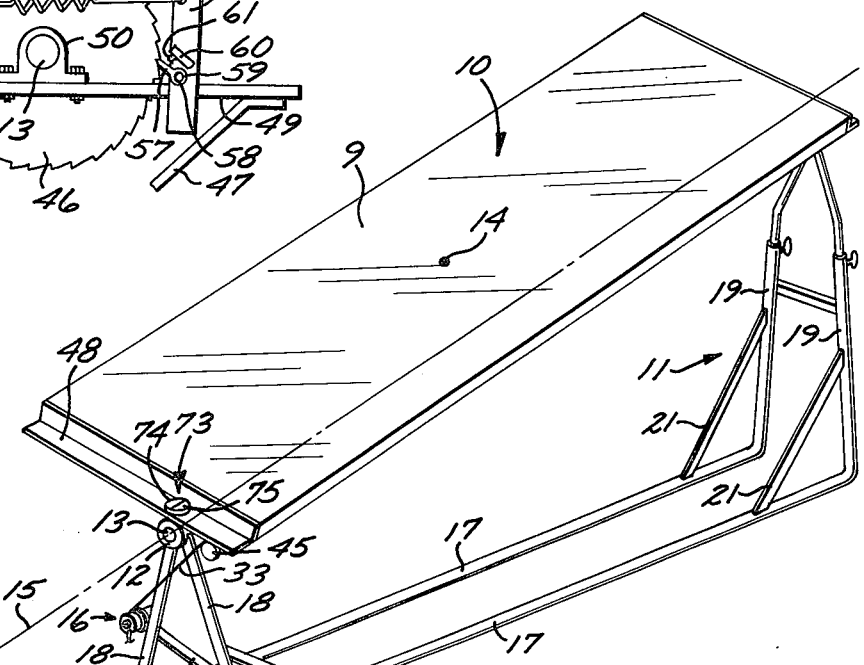
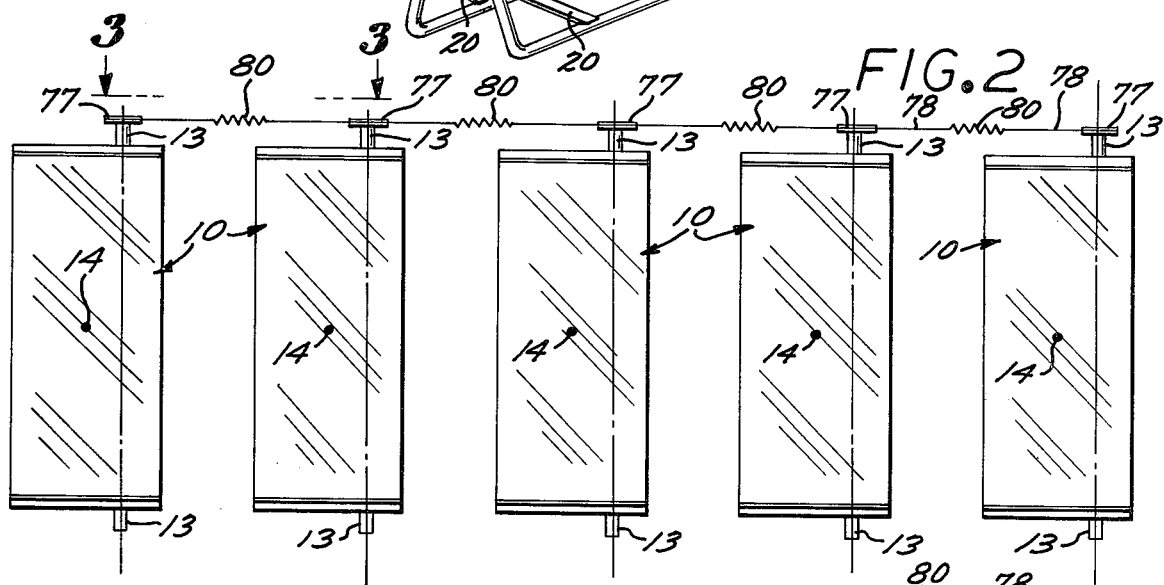
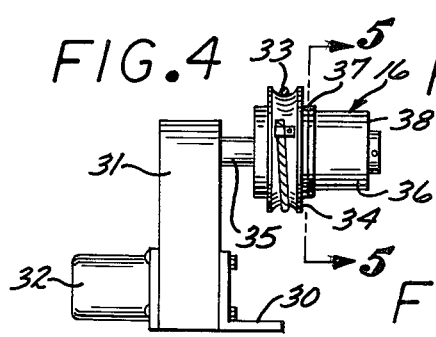
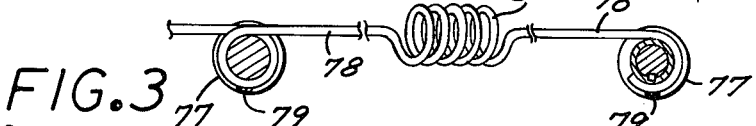
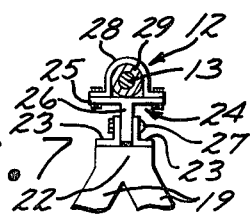
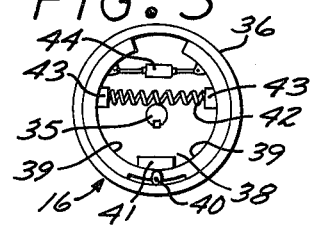

TRACKING SYSTEM FOR SOLAR ENERGY COLLECTION

This is a Continuation-in-Part of U.S. Pat. Application Ser. No. 744,290, filed on Nov. 22, 1976, now U.S. Pat. No. 4,108,154.

FIELD OF THE INVENTION

The present invention relates to solar energy collection devices in which a collector, sensitive to solar radiation, is oriented to face the sun and to change orientation to track the sun as the earth rotates in order to maximize the collection of solar energy.

BACKGROUND OF THE PRIOR ART

Various solar energy collection arrangements have been devised which employ collector panels or reflectors and which are directed at the sun in order to efficiently collect solar energy. Many of the applications of solar tracking systems have been implemented in connection with parabolic reflectors, since proper attitude of parabolic reflector troughs is more critical than is the orientation of flat solar collection panels. Parabolic reflector troughs are generally of uniform cross section and have a concave highly reflective parabolic surface which receives the rays of the sun and reflects this solar radiation into a longitudinally extending concentrator pipe conducting a heat transfer medium and located at the parabolic focus. The reflected solar energy is absorbed in the heat transfer medium, usually a liquid, which flows through the pipe to a heat exchanger.

In prior art systems employing parabolic reflectors, the desirablity of maintaining the trough in proper orientation relative to the position of the sun overhead has been recognized and considerable effort has been directed to implementing workable tracking systems. All conventional systems heretofore employed, however, have been significantly deficient in one or more respects. In the simplest arrangement, where manual orientation is contemplated, the solar collection panels are seldom properly oriented, with the result that energy collection is only occassionally conducted at maximum efficiency. Electromechanical systems have been implemented to maintain proper orientation, but these systems have all involved an inordinate consumption of energy in the process. For example, one and three quarter horsepower motors have been employed to rotate reflector dishes or troughs of conventional solar collection systems. The amount of energy necessary to effectuate rotation detracts significantly from the net energy output achieved using conventional solar collection systems of this type.

In all of the foregoing prior art systems, some positive drive system has been necessary to alter the orientation of the collector. That is, it has heretofore been necessary to drive some mass to effectuate rotation of the collector during the daylight hours in order to maintain proper collector orientation toward the sun. The energy expended in this manner has seriously detracted from the overall benefits to be gained by solar tracking. That is, such collector systems tend to utilize a significant portion of their increased energy output for their own operation, and hence do not significantly improve the net energy output as productive solar energy. The required energy consumption is aggravated with increased size of collector systems which are necessary in order to provide a sufficient energy output to justify the initial cost of maintenance of a solar energy collection system.

In the aforesaid U.S. Pat. Application Ser. No. 744,290, a system of much greater simplicity was implemented. The embodiment depicted in that application involves the lateral movement of a counterweight relative to the rotational axis of a solar collection device to tilt the collector to a controlled degree. That is prior to solar noon, the counterweight is laterally offset from the axis of rotation to tilt the collector toward the east. At solar noon the counterweight is positioned in a vertical plane passing through the center of gravity and the rotational axis of the collector. After solar noon the counterweight is offset from the axis of rotation to tilt the solar collector toward the west. While this arrangement is quite advantageous in overcoming the defects of the prior art, the present invention represents an even greater improvement.

It is an object of the present invention to provide a solar energy tracking arrangement which does not require the movement of a mass of a magnitude proportional to the mass of the solar collector. Rather, the present invention relies upon the force of gravity to effectuate rotation of the collector to maintain proper orientation toward the sun. Energy consumption during the daylight hours only occurs incident to the release of a locking system which opposes the force of gravity. The release mechanism, however, may be a very lightweight device and does not depend in any way upon the mass of the system to be controlled. Preferably, control of the tracking system is achieved by merely withdrawing a pawl from a ratchet gear for a short interval to allow the collector to rotate slightly. An alternative form of the invention involves momentarily disabling an electric brake which otherwise prevents rotation of the collector. In any form of the invention, rotation of the collector results the force of gravity acting upon it. After sunset when the collector no longer is able to receive solar energy, it may either be manually reset to an initial starting position from which it will begin progressing at sunrise, or it may be driven by a very low power motor through a high gear ration, since repositioning of the collector need not be completed before dawn.

A particularly advantageous feature of the invention is its application to flat plate collectors. Previously, tracking systems had not generally been applied to flat plate collectors because any increase in efficiency resulting from a tracking system applied to flat plate collectors could not be justified by the expense of the tracking system. However, it has been found that an overall increase in efficiency of 30 percent is to be expected by applying the present invention to a flat plate solar energy collection panel system. That is, by employing the tracking system of the present invention the number of flat plate solar collection panels that are required to produce a given energy output is decreased by 30 percent. Furthermore, because of the simplicity of the tracking system of the present invention, tracking with flat plate collectors can be achieved without modification of the collector panels themselves and with a minimal investment for a tracking system.

A further object of the invention, especially as applied to flat plate collectors, is to obtain an advantage in facilitating maintenance. In conventional systems, rectangular collectors are packed side by side in a fixed rectilinear array. Consequently, a defect in an interiorally located flat plate collector panel is extremely difficult to reach and service. Using the tracking and orientation system of the present invention, however, the panels need merely be tilted on edge to provide a passageway for access to service, repair and replace interiorally located panels.

A further feature of the invention is the tandem interconnection of collectors in which the rotation of one collector can be transmitted to induce a uniform rotation in all of the collectors using a single rotation restraint applied to a single collector.

A result of utilization of the invention is that the increase in efficiency in a flat plate solar energy collection system achieves a critical goal which is necessary for the application of solar energy to refrigeration. In order to be able to refrigerate to any commercially meaningful degree, temperatures of at least 212° F. must be achieved for a significant refrigerating effect to occur. Conventional flat plate collector systems in stationary arrays are able to achieve consistent temperatures of only about 180° F. However, by implementing the tracking system of the present invention, temperatures in excess of 212° F. may be achieved using flat plate collector systems. This opens up the entire range of cooling applications to implementation by solar energy. This is especially significant since in those areas where the ground surface availability of solar energy is greatest, such as in desert areas, the requirement for air conditioning and other refrigeration is especially great. By increasing the energy collection of solar energy by thirty percent, as is possible using the present invention, the available output in refrigeration capacity of flat plate collector systems is increased by 50 percent during the solar cycle. Thus, not only does the present invention achieve a raw increase in efficiency in solar energy collection, it also expands the efficiency of energy utilization in refrigeration by an even greater percentage.

The effect of increased efficiency in solar energy collection achieved by the present invention utilizing flat plate collectors may be numerically determined by considering the amount of energy lost in flat plate solar panels that are oriented at other than perpendicular incidence to solar radiation. At an angle of 10° relative to normal incidence, there is an energy collection loss of 1 ½%. At 15° this loss increases to 3 ½% while at 20° and 25° the losses are 6% and 9 ½% respectively. It can thus be seen that in conventional flat plate collector systems the efficiency of solar energy collection is less than 90% throughout the greater portion of the solar day with the exception of that time period between 10 am and 4 pm. Since this maximum efficiency period encompasses only four hours out of a 10 hour solar day, and since the present invention increases collection efficiency to over 90% throughout the entire solar day, the magnitude of the advance achieved through the present invention may be appreciated.

DESCRIPTION OF THE DRAWINGS

FIG. 1 is a perspective view of a flat plate collector mounted according to the present invention.

FIG. 2 is a plan view of a rank of collector panels connected in tandem.

FIG. 3 is an enlarged view of the interconnection between two adjacent collectors in the rack of collectors of FIG. 2.

FIG. 4 is one embodiment of a rotation restraining and repositioning mechanism according to the invention.

FIG. 5 is a sectional view taken along the lines 55 of FIG. 4.

FIG. 6 is an elevational view of an alternative rotation restraining mechanism of the invention.

FIG. 7 is a detail of the interconnection of the connecting pins 13 with the subject of the invention.

FIG. 8 is an electrical schematic of the rotation restraining arrangement of FIG. 6.

DETAILED DESCRIPTION OF THE EMBODIMENT

With reference to FIG. 1 an embodiment of the invention is depicted in which a rectangular flat plate solar energy collection panel 10 is mounted upon a support 11 which has longitudinal parallel rails 17 from which upright standards 18 and 19 extend and converge at opposed elevated sleeve-like mounting bearings 12, one of which is visible in FIG. 1. The bearings 12 are longitudinally aligned, generally in a north-south direction. The collector 10 has an expansive light receiving surface 9 and is journaled to the bearings 12 by means of pins 13 that extend axially through the bearings. The pins 13 form the connections between the collector 10 and the support 11 and are laterally offset from the center of gravity 14 of the collector 10. That is, the axis 15, which is a line passing through both of the connecting pins 13 at either end of the collector 10, is offset to the east of the center of gravity 14 when the flat light receiving surface 9 is in tangential alignment relative to the earth's surface and normal to the incidence of the sun's ray at solar noon. As a result of the lateral displacement of the axis of rotation 15 from the center of gravity 14, the weight of the collector 10 acting at the center of gravity 14 tends to rotate the collector 10 to a position with the light receiving surface 9 facing the western horizon of the earth and with the center of gravity 14 and the connecting pins 13 lying in a plane passing through the gravitational center of the earth. That is, the weight of the collector 10 tends to cause it to rotate until the center of gravity 14 reaches its lowest possible location, which occurs when the collector 10 is approximately vertical with the light receiving 9 facing the western horizon.

A rotation restraining lock 16 is mounted on the support 11 and is connected to the collector 10 for controlling the rotation of the flat plate collector 10 to prevent it from assuming the vertical position which it would otherwise seek. The rotation restraining lock 16 governs the rotation of the collector 10 to direct the light receiving surface 9 toward the sun during daylight hours.

The support 11 includes elongated longitudinal metal rails 17 formed of tubular steel which lie parallel to each other in contact with the earth's surface and extend generally in a north-south direction. At the extremities of the rails 17 upright metal support standards 18 and 19, also of tubular steel, are provided. The standards 18 rise from the rails 17 and converge together at their upper extremities to meet at a vertical stub 22 which supports the southernmost mounting bearing 12. The standards 18 are braced to the rails 17 by means of angle bars 20 welded both to the rails 17 and to the standards 18.

The northernmost bearing 12 will typically be higher than the opposing bearing in the northern hemisphere, while the converse is true in the southern hemisphere. The differential elevation is governed by the geologic longitude of the location of the collector 10. That is, a greater height differential will exist between the bearings 12 for a collector located near the artic circle as contrasted with a collector located near the equator. The differential and mounting height also depends upon the date of the year, as the relative migration of the sun between the Tropics of Cancer and Capricorn also influences the proper elevational differential between the mountings 12.

The upright standards 18 as well as the metal standards 19 converge together at their upper ends at their respective positions on the support 11 in a universal joint which includes an upright stub 22 having a horizontal upper surface. The arrangement for the standards 19 is depicted in FIG. 8, although a similar arrangement for the other mounting 12 exists at the southernmost end of the support 11. To the flat upper surface of the stub 22 are welded two opposing angles 23 spaced apart from each other to define a gap therebetween extending in a north-south direction. A T-shaped member 24 has a lateral plate 25 from the center of which a leg 26 extends perpendicularly downward parallel to and between the upward extending legs of the angles 23. A single cylindrical pivot pin 27 extends transversely through the upwardly extending legs of the angles 23 and through the downwardly extending leg 26 of the T-shaped member 24 to form an axis of rotation extending in an east-west direction. The pin 27 is equipped with an enlarged head at one extremity and with a transverse aperture carrying a knockout pin at the other extremity, to entrap the T-shaped member 24 between the angles 23 for rotation relative thereto. A bracket 28 extends in an arc and is bolted at its ends to the lateral plate 25 of the T-shaped member 24 to define an aperture therebetween to carry an annular bearing race 29 to complete the bearing 12. The bearing race 29 in turn receives a connecting pin 13 that extends longitudinally from the collector 10. A universal joint and bearing assembly similar to that of FIG. 8 is provided at the low or southernmost end of the support 11 where the standards 18 converge.

The arrangement of FIG. 8 is advantageous in that it accomodates adjustments in height of the standards 19, which may be formed of telescoping members. A thumbscrew 85 is provided and extends transversely through the wall of the outer tubular member of each of the standards 19 to affectuate a secure engagement relative to the interior tube. Height adjustments can thereby be made in the standards 19 to alter the elevation of the northernmost end of the collector 10 to properly orient the collector to directly face the sun. The universal joint of the type depicted in FIG. 8 allow this to be done without disrupting the interconnection between the collector 10 and support 11, since the T-shaped member 24 will merely rotate to accomodate the changes in alignment. Thus, the connecting pins 13 are prevented from binding within the bearing races 29 since the pins 13 and bearing races 29 are varied together in their orientation.

The flat plate collector 10 is of a conventional commercial variety in which a shallow hollow rectangular panel is formed with a heat transfer fluid flowing therethrough within a serpentine tube lying within the panel. A cover forming the light receiving surface 9 and transparent to solar radiation protects the tubing from the environment and causes the panel to act like a greenhouse, trapping the sun's rays to raise the temperature of the heat transfer fluid within the tubing. The tubing normally enters and exits the collector panel through a central aperture in one or both of the connection pins 13. If the inlet and outlet are combined at a single one of the connections pins 13, they may be formed in either a concentric arrangement or they may be separate and adjacent to each other. Heated fluid leaving the collector 10 is pumped through a heat exchanger where the heat energy extracted from the solar radiation is either stored or transformed to some other form of energy, such as electrical power.

The connection pins 13 are normally linearly aligned along an axis 15 which passes to the right of the center of gravity of the collector 10 when viewed from the heat absorbing surface 9. The connection pins 13 at the two ends of the collector 10 can, however, be either horizontally or vertically offset from each other if desired. It is necessary only that the center of gravity 14 lie to the left of a line extending between the two connection pins 13, so that if unrestrained, the collector 10 will tilt so that the light collecting surface 9 faces generally toward the western horizon.

A rotation restraining system may take one of several forms. For example, the electric brake 16 of FIGS. 1, 4 and 5 may be employed. In the electric brake system 16 an angle 30 may be bolted or welded to one of the standards 18 and gear reducing transmission 31 is mounted on the angle 30. A small electric drive motor 32 in turn is supported on the transmission 31 and is used to reel in a cord 33 wound about a pulley 34 connected at the output of the transmission 31 to reposition the collector 10 at night. The electric brake 16 acts as a clutch and normally secures the pulley 34 to the cylindrical output shaft 35 of the transmission 31 so that the pulley 34 normally moves with the shaft 35 and is prevented from rotating unless the shaft 35 is driven by the motor 32. The motor 32 is normally inactive, however, during daylight hours and is actuated only at night to reposition the collector 10.

The electric brake 16 has a sleeve shaped cover 36 terminating at one end in an annular rim 37 which is rigidly secured to the pulley 34. Within the other end of cover 36 is a disk shaped end wall 38 with a central cylindrical aperture therethrough for receiving the output shaft 35 of the transmission 31. The disk shaped end wall 38 is keyed to the shaft 35 and is normally interconnected to the sleeve 36 by means of a brake shoe arrangement similar to that utilized in automotive vehicles. The brake shoes 39 are illustrated in FIG. 7 and are pivoted together about a pivot pin 40 extending from a reinforced mounting block 41 that is secured to the end wall 38. The brake shoes 39 are normally biased outward to engage the sleeve 36 by means of a compressed spring 42 which acts against pedestals 43 located on the interior surfaces of the brake shoes 39. The spring 42 rotates the brake shoes 39 outward away from each other about the pivot pin 40. Thus, the spring 42 is of sufficient strength to effectuate engagement between the annular sleeve 36 and the end wall 38, and hence the shaft 35. In its normal condition the brake 16 causes rotation of the shaft 35 to control rotation of the pulley 34. Rotation of the shaft 35, as previously noted, normally would occur only at night during repositioning of the collector panel 10 to face the eastern horizon.

During the daylight hours, however, a timer mechanism periodically activates solenoid 44 which includes armatures connected by wires to the interior surfaces of the brake shoes 39. Upon actuation, the solenoid 44 draws inward on the armatures which in turn pull the brake shoes 39 in rotation towards each other pivoting them in opposing directions of rotation about the pivot pin 40. When drawn inward in this manner, the brake shoes 39 release the sleeve 36 to a sufficient degree so that the weight of the collector 10, acting at the center of gravity 14, is able to rotate the collector to track the path of the sun across the sky. When the solenoid 44 is actuated, the sleeve 36, depicted in FIG. 5 is released from engagement with the end wall 38 and is turned to allow a portion of the cord 33 to be drawn upward as the cord connection pin 45 on the collector 10 rises. The weight at the center of gravity 14 of the collector 10 causes the collector to rotate, thereby raising the cord connection pin 45. Unless additional cord is released, however, the collector 10 is prevented from turning in response to the gravitational force of the weight of the collector panel, and hence rotation of the collector 10 is controlled.

An alternative embodiment of a rotation restraining mechanism is depicted in FIG. 6. In this arrangement, a ratchet wheel 46 is journaled to the connection pin 13 at the southernmost end of the collector panel 10 and is rigidly connected thereto to rotate with the collector 10. Inclined braces 47 extend downward at an angle from the underside of a flat support deck 49 at the southernmost end of the collector 10 and secure the flat support deck 49 in a fixed disposition relative to the support 11 by welded attachment to the standard 18 at locations not depicted. The deck 49 is located outside of the universal connection joint joining the support 11 and the collector 10. The ratchet wheel 46 is divided into two types of teeth, each encompassing about 180° of the circumference of the ratchet wheel. The teeth 51 are formed at spaced intervals about a portion of the circumference of the ratchet wheel 46 as indicated and define semicircular grooves therebetween. The semicircular grooves are shaped to receive a latching bar 52 mounted on a pawl 53 which is hinged for rotation so that the latching bar 52 can be moved radially relative to the ratchet wheel 46. The opposing end of the pawl 53 is mounted at a rotatable connection 54 to a bracket 55 extending from the underside of the deck 49.

The other portion of the circumference of the ratchet wheel 46 is equipped with teeth 56 which form a saw tooth configuration designed to receive another pawl 57 on the side of the ratchet wheel 46 opposite the pawl 53. The pawl 57 is under the influence of a counterclockwise bias by means of a coil spring 58 acting upon it and wrapped about the pivot connection pin 59. In this way, the pawl 57 is biased into engagement with the ratchet teeth 56. Slightly above the rotation connection 59 is located a microswitch housing 60 having a microswitch lever 61 extending into the path in which the pawl 57 is moved by counterclockwise rotation of the ratchet wheel 46. Thus, such counterclockwise rotation of the ratchet wheel 46 causes the pawl 57 to actuate the microswitch 60 by tripping the switch lever 61 thereon.

The microswitch 60 is mounted rigidly onto a support bar 62, which in turn is securely connected to the deck 49. Coil springs 63 and 64 are attached to the pawl 53 and extend in opposite directions to create opposing forces on the pawl 53. The coil spring 63 is attached to the mounting bar 62 and tends to rotate the pawl 53 clockwise to cause engagment of the latching bar 52 in the semicircular recesses between the teeth 51. The spring 64 is connected to a solenoid assembly 65 which may be actuated periodically to withdraw an armature 66, which acts through the spring 64 to overcome the force of the spring 63 and to rotate the pawl 53 counterclockwise and withdraw the latching bar 52 from the ratchet wheel 46.

The electrical circuitry for the rotation restraining mechanism of FIG. 6 is depicted in FIG. 7. The circuit includes a timer 65 which has contacts 67' that are normally open. When the timer circuit is actuated, the contacts 67' close thereby providing power to the coil 68 of the solenoid assembly 65 through the normally closed contacts 69 to draw the solenoid armature 66 inward, thereby disengaging the latching bar 52 from the ratchet wheel 46. Once the latching bar 52 has been withdrawn from the ratchet wheel 46, the ratchet 46 will begin to rotate with the entrapped connection pin 13 and the collector panel 10 in a counterclockwise direction as viewed in FIG. 6. The pawl 57 then rides up the incline of a passing tooth 56 to trip the switch lever 61 of the microswitch 60. The normally open contacts of the microswitch 60 are depicted at 60' in FIG. 7. When these contacts are closed by the action of the pawl 57, current flows through the power leads 70 to provide electrical power to a relay 71 located within the solenoid assembly 65. The relay 71 opens the normally closed contact 69 of the solenoid assembly 65 and closes the normally open contacts 72 associated therewith in order to maintain the relay 71 in the circuit despite the reopening of the points 60' that will occur as soon as the ratchet tooth 56 has passed the pawl 57 so that the pawl 57 releases the microswitch lever 61. The relay 71 thereby disables the solenoid assembly 65 by opening the points 69, and the spring 63 acts upon the pawl 53 to draw the latching bar 52 inward to engage the latching wheel 46 at the next sequential semicircular depression between teeth 51. The relay 71 is deactivated to allow the contacts 72 to open and the contacts 69 to close when the timer circuit 67 opens the contacts 67'. The process is repeated periodically to allow the collector 10 to rotate with the ratchet wheel 46 in a counterclockwise direction as viewed in FIG. 6.

Instead of a timer circuit for actuating the rotation restraining devices of the invention, a photodetection unit 73 may be employed to provide a power connection to the solenoid assembly 65 in FIG. 6 or the solenoid 44 in FIG. 5. The photodetection unit 73 is depicted in FIG. 1 and is oriented on the ledge 48 and includes a pair of matched photosensors, one positioned in each of two adjacent compartments 74 and 75. The outputs of the photosensors in these two compartments are compared in conventional analog logic circuitry and the differential of the output is used to actuate a switch to provide power on the leads 70.

Preferably, an entire rank of collectors 10 are mounted in parallel orientation and are arranged at spaced intervals in an east-west direction. A single rotation restraining mechanism, such as depicted in FIGS. 4 and 5, need be associated with but a single collector 10 in order to operate all of the collectors in the rank depicted in FIG. 2. In this arrangement, the collectors 10 are connected by a tandem linkage that includes a pulley 77 located at the end of each collector 10. A drive line 78 is connected at one end to the pulley 77 of the first collector 10 by means of a set screw and clamp connection 79. The drive line 78 then extends to the next pulley 77, preferably through some form of elastic strain relief, such as a coil spring 80. A separate spring 80 is interposed in the drive line 78 between adjacent pulleys 77. The drive line 78 then looped over each of the interior pulleys 77 and is secured thereto by a set screw and clamp 79 so that one point on the drive line 78 is rigidly attached to each pulley 77. The drive line 78 is then extended on to the next pulley through a strain relief coil spring 80 so that all of the collectors 10 may be operated in tandem, and controlled rotational movement of one collector is transmitted to all of the collectors.

In the operation of the invention, the low power electric motor 32 is activated overnight to drive the shaft 35 through the transmission 31. This reels in the cord 33 and winds it about the pulley 34 in FIG. 4, thus drawing the cord connection pin 45 downward to rotate the collector 10 clockwise in FIG. 1 until it is approximately vertical and facing the eastern horizon. This motion is transmitted through all of the collectors 10 of FIG. 2 so that all are uniformly oriented to receive the sun's rays perpendicular to the light receiving surface 13 as the sun rises. As the sun progresses in its path of relative movement overhead, the timing mechanism 67 or photosensor 73 momentarily disables the rotation restraining mchanism, which may be either the electric brake of FIGS. 4 and 5 or the ratchet restraining system of FIGS. 6 and 7. In either event, the collectors 10 undergo stepped tandem movement in counterclockwise rotation. This movement is caused by the weight of the collector panels 10 which, acts at the centers of gravity 14. Since the collectors are each eccentrically mounted about the connection pins 13 they rotate from an east facing to a west facing orientation throughout the course of the day.

As previously indicated, however, uncontrolled rotation is prevented by the rotation restraint system employed except during temporary periods of deactivation of the rotation restraining device. At these times the collector panels 10 are free to turn to maintain an orientation toward the sun.

The springs 80 interconnecting the pulley 77 associated with the different collectors 10 accommodate uneven forces that may be applied to the different collectors 10, such as by gusts of wind that may momentarily disorient the collectors to a varying degree.

It can be seen that very little energy is expended in controlling the rotation of the collectors panels 10 according to the invention. The force of gravity is the principal moving force, and need only be overcome in resetting the collectors 10 at night for use the following morning. Because of the long period throughout which the collectors 10 may be repositioned, a very low power motor 32 may be employed for this purpose. Also, because there is no power drain during the day, the usable power produced by the solar collectors is available for maximum utilization during the day time. This is particularly advantageous in refrigeration applications where an incremental increase in energy output at the maximum operating capability of the collectors produces exceptionally large benefits in refrigeration effects. Thus an increment in output in a sense achieves a bonus in results.

It is to be understood that various alternative embodiments and modifications of the invention will become readily apparent to those familiar with the collection of solar energy. For example, while the invention has been illustrated in connection with flat plate collectors, it is equally applicable to collectors that employ parabolic reflector troughs. Also, the rotation restrain need not limit rotation to stepped advances, but can allow a slow, continuous rotation of the collector. Moreover, a wide variety of rotation controlling devices will undoubtedly become readily apparent. The invention, therefore, should not be limited by the specific embodiments disclosed herein, but rather is defined in the claims appended hereto.

I claim:

1. A solar energy collection system including:
   a stationary support having opposing elevated mountings generally oriented in a plane passing through the poles of the earth,
   a collector having an expansive light receiving surface and journaled to said mountings for rotation relative thereto at connections, the longitudinal alignment of which is generally in the aforesaid plane passing through the poles of the earth and laterally offset to the east from the center of gravity of said collector, whereby said collector tends to rotate to a position with said light receiving surface directed toward the western horizon of the earth and with said center of gravity and said connections lying in a plane passing through the gravitational center of the earth, and
   releasable rotation restraining means interconnecting said support and said collector for restraining the rotation of said collector from east facing to west facing and releasable to allow controlled rotation of said collector by gravity to thereby direct said light receiving surface toward the sun during daylight hours.

2. The solar energy collection system of claim 1 further characterized in that said connections are linearly aligned normal to a cross section through said collector.

3. The solar energy collection system of claim 1 further characterized in that said rotation restraining means includes an arcuate ratchet having a plurality of teeth and coaxially mounted relative to at least one of said connections, a pawl engageable with different ones of said teeth throughout rotation of said collector relative to said support, and a timing mechanism coupled to said pawl to periodically withdraw said pawl from engagement between sequential ones of said ratchet teeth to allow said collector to rotate, and to release said pawl to allow re-engagement between said pawl and said ratchet between different teeth thereof, thereby arresting rotation of said collector.

4. The solar energy collection system of claim 3 further characterized in that said rotation restraining means further comprises a solenoid actuated by said timer and connected to withdraw said pawl and a circuit breaker mechanism operably responsive to rotation of said collector to deactivate said solenoid, thereby releasing said pawl.

5. In a solar energy absorption system employing a collector mounted upon a base supported and operable at maximum efficiency when oriented to directly face the sun, the improvement wherein said collector is mounted for rotation relative to said base at opposing connections generally aligned in a north-south direction in a plane passing generally through the poles of the earth and offset to the east from the center of gravity of said collector when said collector is oriented to face the sun at solar noon whereby said collector tends to rotate to a position in which its center of gravity lies directly below the longitudinal alignment of said connections, and further comprising rotation control means for retarding rotation of said collector from east facing to west facing resulting from gravitational force acting thereon and releasable to allow collector rotation under the force of gravity to thereby effectuate controlled rotation to a degree co-ordinated with the rotation of the earth relative to the sun to maintain orientation of said collector to directly face the sun during daylight hours.

6. The solar energy absorption system of claim 5 further characterized in that said rotation control means includes an electric brake to normally exert an immobilizing force to oppose the aforesaid gravitational force to hold said collector and said base support immovable relative to each other and which is activated by an electrical signal to reduce said immobilizing force.

7. The solar energy absorption system of claim 6 further comprising differential photosensor means associated with said collector for producing an electrical signal to said electric brake when said collector fails to directly face the sun.

8. A solar energy absorption system employing a plurality of separate collectors which are operable at maximum efficiency when oriented to directly face the sun and which are mutually spaced at intervals in a rank extending in an east-west direction and each of which is rotatably mounted upon a base support at a pair of opposing connections generally aligned in a north-south direction in a plane passing generally through the poles of the earth, and offset to the east from the center of gravity of the supported collector, whereby each collector tends to rotate to a position in which the center of gravity thereof lies directly below the longitudinal alignment of said connections with said collector oriented to generally face the western horizon, and including rotation control means connected between one of said collectors and said base support to retard collector rotation resulting from gravitational force acting thereon and releasable to allow collector rotation under the force of gravity to thereby effectuate controlled rotation from east facing to west facing to maintain collector orientation toward the sun during daylight hours and further including tandem linkage to interconnect all of said collectors to cause said collectors to all move in unison to effectuate tandem rotation control thereover by means of said rotation control means.

9. The solar energy absorption system of claim 8 further characterized in that said tandem linkage includes a plurality of pulleys, each rotatably mounted at a connection and coupled to a different one of said collectors, and a drive line is attached to each of said pulleys and is connected to said rotation control means to link said collectors to each other and to said rotation control means, and fastening means secures said drive line to each of said pulleys to form fixed attachments relative thereto, whereby controlled rotational movement of one of said collectors is transmitted to all of said collectors.

10. The solar energy absorption system of claim 9 further characterized in that elastic strain relieving means are interposed in said drive line between adjacent ones of said pulleys.

11. The solar energy absorption system of claim 10 wherein said rotation control means includes a periodically releasable brake mechanism for normally overcoming gravitational forces acting on said collector and an electric motor drive for rotating said collectors during hours of darkness to reposition said collectors to face the eastern horizon.

* * * * *